US012128687B2

(12) United States Patent
Lu et al.

(10) Patent No.: US 12,128,687 B2
(45) Date of Patent: Oct. 29, 2024

(54) METHOD FOR CONTROLLING REGENERATED CHIP, REGENERATED CHIP AND REGENERATED INK CARTRIDGE

(71) Applicant: HANGZHOU CHIPJET TECHNOLOGY CO., LTD., Hangzhou (CN)

(72) Inventors: Hechao Lu, Hangzhou (CN); Tingting Gao, Hangzhou (CN); Xinping Peng, Hangzhou (CN)

(73) Assignee: HANGZHOU CHIPJET TECHNOLOGY CO., LTD., Hangzhou (CN)

( * ) Notice: Subject to any disclaimer, the term of this patent is extended or adjusted under 35 U.S.C. 154(b) by 157 days.

(21) Appl. No.: 17/948,228

(22) Filed: Sep. 20, 2022

(65) Prior Publication Data

US 2023/0012367 A1 Jan. 12, 2023

Related U.S. Application Data

(63) Continuation of application No. PCT/CN2021/085243, filed on Apr. 2, 2021.

(30) Foreign Application Priority Data

Jun. 11, 2020 (CN) ......................... 202010528226.4

(51) Int. Cl.
*B41J 2/175* (2006.01)

(52) U.S. Cl.
CPC ................................. *B41J 2/17503* (2013.01)

(58) Field of Classification Search
CPC .......................... B41J 2/17503; B41J 2/17546
See application file for complete search history.

(56) References Cited

FOREIGN PATENT DOCUMENTS

| | | | | | |
|---|---|---|---|---|---|
| CA | 2635590 | A1 * | 7/2007 | .......... | B41J 2/17546 |
| CN | 103072380 | A | 5/2013 | | |
| CN | 203438670 | U | 2/2014 | | |
| CN | 104070824 | A | 10/2014 | | |
| CN | 104097401 | A | 10/2014 | | |
| CN | 105398226 | A | 3/2016 | | |
| CN | 105538916 | A | 5/2016 | | |
| CN | 106240161 | A | 12/2016 | | |

(Continued)

OTHER PUBLICATIONS

International Search Report of PCT/CN2021/085243.
China Office Action of 202010528226.4.
European search report of EP21822814.6.

*Primary Examiner* — Sharon Polk

(57) ABSTRACT

A method for controlling a regenerated chip, a regenerated chip, and a regenerated ink cartridge are provided. The regenerated chip is electrically connected to a printer by means of a first data signal wire and a logic signal wire, and is electrically connected to an ink cartridge chip by means of a second data signal wire. The method for controlling a regenerated chip includes: detecting an operation command sent by the printer by means of the first data signal wire and the logic signal wire; and when it is detected that the operation command is not a selected operation command, sending a data signal to the ink cartridge chip by means of the second data signal wire, wherein the data signal instructs the ink cartridge chip to communicate with the printer.

20 Claims, 6 Drawing Sheets

(56) References Cited

FOREIGN PATENT DOCUMENTS

| | | | | | |
|---|---|---|---|---|---|
| CN | 207669999 | U | | 7/2018 | |
| CN | 111746133 | A | | 10/2020 | |
| CN | 212949729 | U | | 4/2021 | |
| EP | 3395577 | A1 | | 10/2018 | |
| WO | WO2017107045 | A1 | | 6/2017 | |
| WO | WO-2020082826 | A1 | * | 4/2020 | .......... B41J 2/17503 |

* cited by examiner

METHOD FOR CONTROLLING REGENERATED CHIP, REGENERATED CHIP AND REGENERATED INK CARTRIDGE

CROSS-REFERENCE TO RELATED APPLICATIONS

This application is a continuation of international patent application No. PCT/CN2021/085243 filed on Apr. 2, 2021, which itself claims priority to Chinese patent application No. 202010528226.4, filed on Jun. 11, 2020. The contents of the above identified applications are hereby incorporated herein in their entireties by reference.

TECHNICAL FIELD

The present disclosure relates to the field of a printer, and in particular, to a regenerated chip, a regenerated ink cartridge, and a method for controlling the regenerated chip.

BACKGROUND

With increasing awareness of environmental protection and demand for resource recycling, reuse of a regenerated chip of an ink cartridge has been greatly improved, and more and more waste ink cartridges are reused, reducing waste and pollution to the environment.

In the related art, a data signal wire of a printer can be used to read data stored in a chip of an original ink cartridge, which can be data of a selected storage unit, except when the data stored in the chip of the original ink cartridge is no longer available. Therefore, it is necessary to stop communication through the data signal wire between the printer and the original ink cartridge and directly connect the regenerated chip to the printer through a communication signal wire. As such when the printer reads data of a data storage area of the chip of the original ink cartridge, the DATA signal can only enter a data area of the regenerated chip to read data stored in the regenerated chip.

However, in the related art, the DATA signal is not only configured to read the data of the data storage area of the chip of the original ink cartridge, but also has other functions, such as a function of a logic signal of controlling selection of a print spot of the ink cartridge. Therefore, stopping a DATA signal communication between the printer and the original ink cartridge would affect other important functions including the selection of the print spot of the ink cartridge when an upgraded printer prints, and affect printing effect, resulting in poor printing quality of the printer with the regenerated chip.

For the issue of poor printing quality of the printer with the regenerated chip, no effective solution has been proposed so far.

SUMMARY

According to various embodiments of the present disclosure, a method for controlling a regenerated chip, a regenerated chip, and a regenerated ink cartridge are provided to solve a problem of poor printing quality of the printer with the regenerated chip in the related art.

In a first aspect, the present disclosure provides the method for controlling the regenerated chip. The regenerated chip is electrically connected to a printer by means of a first data signal wire and a logic signal wire, and is electrically connected to an ink cartridge chip by means of a second data signal wire. The method includes: detecting an operation command sent by the printer by means of the first data signal wire and the logic signal wire; and when it is detected that the operation command is not a selected operation command, sending a data signal to the ink cartridge chip by means of the second data signal wire. The data signal is configured to instruct the ink cartridge chip to communicate with the printer.

In an embodiment of the present disclosure, after the detecting the operation command sent by the printer, the method further includes: when it is detected that the operation command is the selected operation command, controlling the second data signal wire to be turned off and feeding back storage data to the printer by means of the first data signal wire.

In an embodiment of the present disclosure, before the sending the data signal to the ink cartridge chip by means of the second data signal wire, the method further includes: detecting a feedback voltage between a first storage module of the regenerated chip and a second storage module of the ink cartridge chip; sending the data signal to the ink cartridge chip when the feedback voltage is greater than or equal to a preset voltage; and controlling the second data signal wire to be turned off when the feedback voltage is less than the preset voltage. The first storage module and the second storage module are connected in parallel.

In an embodiment of the present disclosure, after detecting the feedback voltage between the first storage module of the regenerated chip and the second storage module of the ink cartridge chip, the method further includes: when it is detected that the operation command is not the selected operation command or the feedback voltage is greater than or equal to the preset voltage, sending the data signal to the ink cartridge chip; and when the selected operation command is detected and the feedback voltage is less than the preset voltage, controlling the second data signal wire to be turned off.

In an embodiment of the present disclosure, the method further includes: when the feedback voltage is greater than or equal to the preset voltage, generating a turn-on sub-signal; when the feedback voltage is less than the preset voltage, generating a turn-off sub-signal; when it is detected that the operation command is not the selected operation command or the turn-on sub-signal is detected, sending the data signal to the ink cartridge chip; and when both the selected operation command and the turn-off sub-signal are detected, controlling the second data signal wire to be turned off.

In an embodiment of the present disclosure, detecting that the operation command sent by the printer is not the selected operation command includes: when it is detected that each of a group of section signals, a group of row signals, and a group of column signals in the operation command is expressed as at least one high level, determining that the operation command is the selected operation command; and when it is detected that at least one of the group of section signals, the group of row signals, and the group of column signals is not expressed as high level, determining that the operation command is not the selected operation command.

In an embodiment of the present disclosure, a communication between the ink cartridge chip and the printer includes a communication for spray point control or a communication for inkjet time transmission.

In an embodiment of the present disclosure, the method further includes controlling turn-on or turn-off of the second data signal wire by means of a switch circuit. The switch circuit is disposed in a wafer of the regenerated chip, or outside the wafer of the regenerated chip.

In an embodiment of the present disclosure, the switch circuit comprises at least one of a triode switching circuit, a switching diode, a logic gate circuit, or a bistable trigger.

In a second aspect, the present disclosure provides the regenerated chip which is applied to the regenerated ink cartridge. The regenerated chip includes a logic control module and a first storage module. The logic control module is electrically connected to a printer by means of a first data signal wire and a logic signal wire, and is electrically connected to an ink cartridge chip by means of a second data signal wire. The logic control module includes a command analysis unit configured for detecting an operation command sent by the printer by means of the first data signal wire and the logic signal wire. The logic control module is configured for sending a data signal to the ink cartridge chip by means of the second data signal wire when it is detected that the operation command is not a selected operation command. The data signal is configured to instruct the ink cartridge chip to communicate with the printer. The logic control module is further configured for controlling the second data signal wire to be turned off when it is detected that the operation command is the selected operation command, and the first storage module is configured for feeding back storage data to the printer by means of the first data signal wire.

In an embodiment of the present disclosure, the logic control module further includes a voltage feedback unit. The voltage feedback unit is configured for detecting a feedback voltage between the first storage module of the regenerated chip and a second storage module of the ink cartridge chip, and the first storage module and the second storage module are connected in parallel. The logic control module is further configured for sending the data signal to the ink cartridge chip when the feedback voltage is detected to be greater than or equal to a preset voltage. The logic control module is further configured for controlling the second data signal wire to be turned off when the feedback voltage is detected to be less than the preset voltage.

In an embodiment of the present disclosure, the regenerated chip is provided with a switching circuit, the switching circuit is connected to the logic control module, and the switching circuit is disposed in the regenerated chip or outside a wafer of the regenerated chip. The logic control module is further configured for controlling turn-on or turn-off of the second data signal wire by means of the switch circuit.

In a third aspect, the present disclosure provides a regenerated ink cartridge. The regenerated ink cartridge includes an ink cartridge body, an ink cartridge chip and a regenerated chip. The ink cartridge body is connected to the ink cartridge chip, and the regenerated chip is configured for implementing the method as described in the first aspect above.

In contrast to the related art, the present disclosure provides the method for controlling the regenerated chip, the regenerated chip, and the regenerated ink cartridge. The regenerated chip is electrically connected to the printer by means of the first data signal wire and the logic signal wire, and is electrically connected to the ink cartridge chip by means of the second data signal wire. The operation command sent by the printer through the first data signal wire is detected by the first data signal wire and the logic signal wire. When it is detected that the operation command is not the selected operation command, the data signal is sent to the ink cartridge chip by means of the second data signal wire. The data signal is configured to instruct the ink cartridge chip to communicate with the printer, solving the problem of poor printing quality of the printer with the regenerated chip.

Details of one or more embodiments of the present disclosure are presented in the following accompanying drawings and description to enable other features, purposes and advantages of the present disclosure more concise and understandable.

BRIEF DESCRIPTION OF THE DRAWINGS

In order to better describe and explain the embodiments and/or examples of those disclosures disclosed herein, one or more drawings may be referred to. The additional details or examples used to describe the drawings should not be considered as limiting the scope of any of the disclosed disclosures, the currently described embodiments and/or examples, and the best mode of these disclosures currently understood.

Figure 1A:
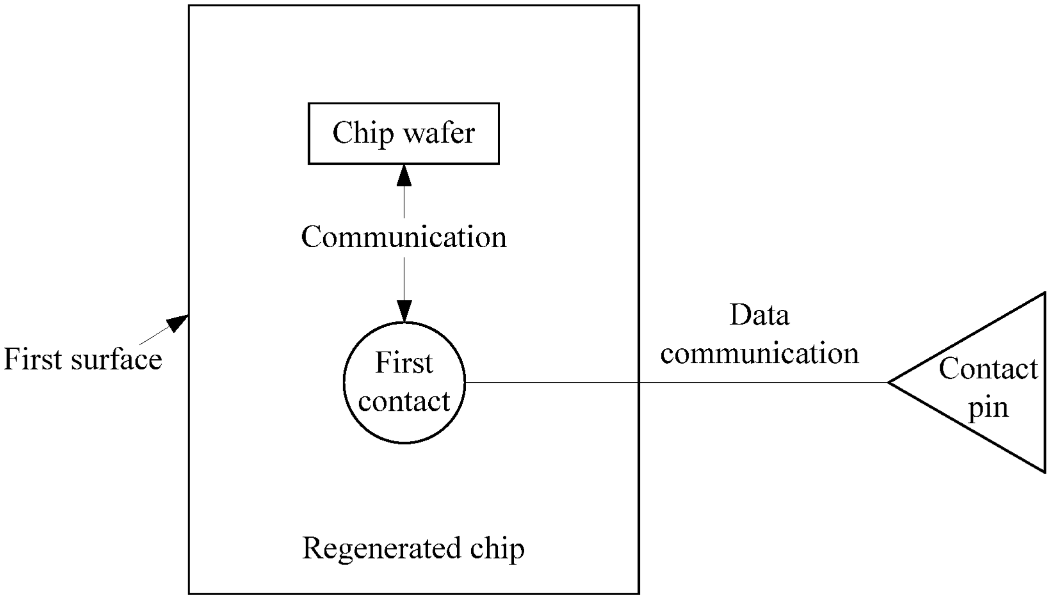
FIG. 1A is a first schematic diagram of a soldering manner of a regenerated chip in an embodiment of the present disclosure.

In the figures, 22 represents a regenerated chip; 24 represents a logic control module; 26 represents a first storage module; 42 represents a command analysis unit; 62 represents a voltage feedback unit; 92 represents a switch circuit; 102 represents a printer body; 104 represents an ink cartridge chip; 106 represents an ink cartridge body; and 108 represents a regenerated ink cartridge.

DETAILED DESCRIPTION

In order to make the purpose, technical solutions and advantages of the present disclosure clearer and more understood, the present disclosure will be described and illustrated below with reference to the accompanying drawings and embodiments. The described embodiments herein are intended to explain the present disclosure only and are not intended to limit the present disclosure. Based on the embodiments of the present disclosure, all other embodiments obtained by one skilled in the art without creative efforts all belong to the scope of protection of the present disclosure.

It is apparent that the accompanying drawings in the following description are only some examples or embodiments of the present disclosure, and that the present disclosure may be applied to other similar scenarios in accordance with these drawings without creative efforts by one skilled in the art. It is also understood that, although the efforts made in such development process may complex and lengthy, some changes of design, manufacturing or production based on the technical content disclosed in the present disclosure are only conventional technical means for one skilled in the art related to the content disclosed in the present disclosure, and should not be construed that the content disclosed in the present disclosure is inadequate.

References to "embodiment" in the present disclosure mean that a particular feature, a structure, or a characteristic described in conjunction with an embodiment may be included in at least one embodiment of the present disclosure. The occurrence of the "embodiment" at various positions in the specification does not necessarily mean the same embodiment, nor is it a separate or alternative embodiment that is mutually exclusive with other embodiments. It is understood, both explicitly and implicitly, by one skilled in the art that the embodiment described in the present disclosure may be combined with other embodiments without conflict.

Unless otherwise defined, all technical and scientific terms used herein have the same meaning as a skilled person in the art would understand. The term "one", "a", "an", "the" and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods, systems, products or devices including a series of steps or modules (units) are not limited to listed steps or modules (units), but may include steps or modules (units) not listed, or may include other steps or modules (units) inherent in those processes, methods, systems, products or devices. The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. Normally, the character "/" indicates that the objects associated with each other are in an "or" relationship. The terms "first", "second", "third", etc. involved in the present disclosure are only configured for distinguishing similar objects, and do not represent a specific order of the objects.

In an embodiment, a regenerated chip is provided which is applied to a regenerated ink cartridge and covering on an ink cartridge chip of the regenerated ink cartridge. FIG. 1A is a first schematic diagram of a soldering manner of a regenerated chip in an embodiment of the present disclosure. As shown in FIG. 1A, a chip wafer and a first contact can be disposed on a first surface of the regenerated chip, the chip wafer is connected and in communication with the first contact, and the first contact is in communication with a contact pin for data. It is understood that the chip wafer of the regenerated chip can be disposed on either surface of the regenerated chip.

Figure 1B:
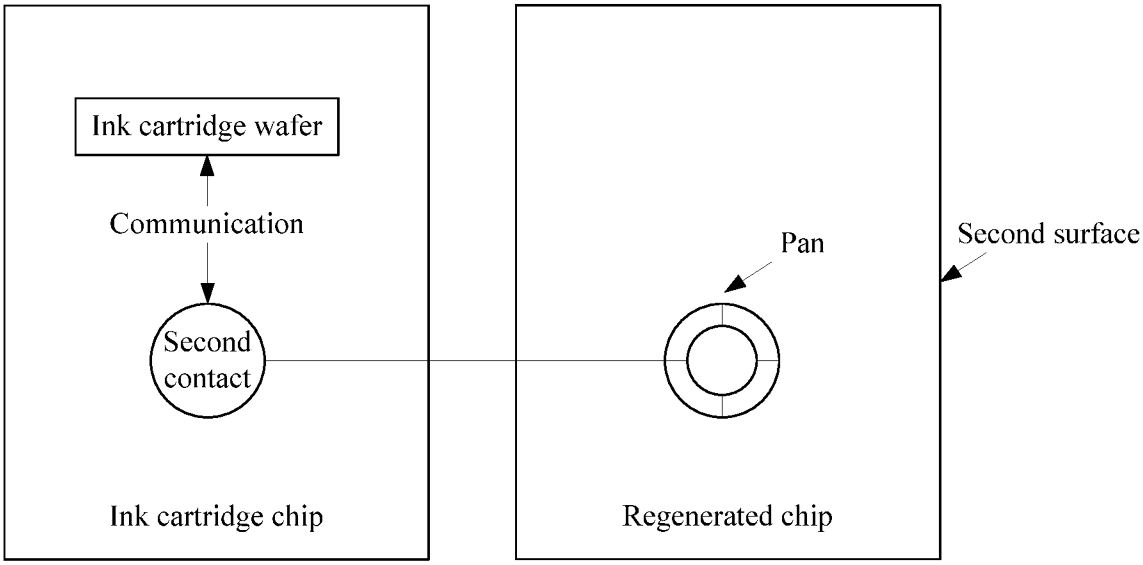
FIG. 1B is a second schematic diagram of a soldering manner of a regenerated chip in an embodiment of the present disclosure.

FIG. 1B is a second schematic diagram of a soldering manner of a regenerated chip in an embodiment of the present disclosure. As shown in FIG. 1B, the ink cartridge chip is provided with an ink cartridge wafer and a second contact, and the ink cartridge wafer is connected and in communication with the second contact. A pad can be disposed on a second surface of the regenerated chip, and a solder joint on the pad can be melted, enabling the solder joint to be electrically connected to the corresponding second contact.

Figure 1C:
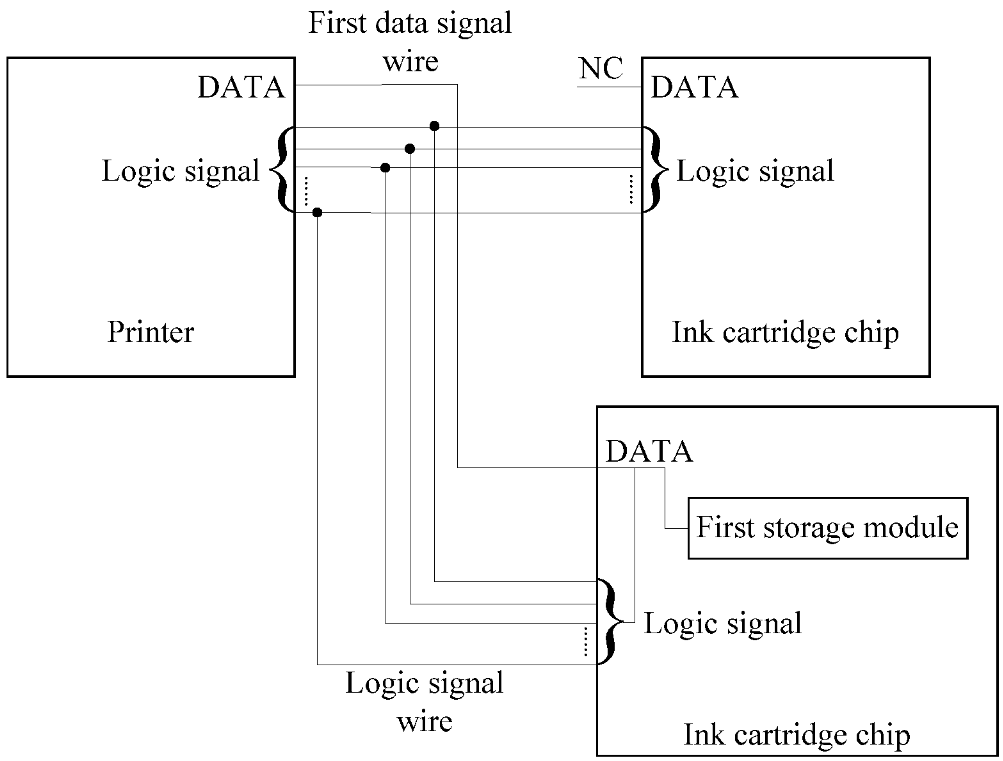
FIG. 1C is a schematic diagram of a circuit principle of a regenerated chip in the related art.

FIG. 1C is a schematic diagram of a circuit principle of a regenerated chip in the related art. As shown in FIG. 1C, the regenerated chip can include a first storage module, which is connected to a printer by a first data signal wire, and the ink cartridge chip is directly disconnected from the printer in a data signal connection, so that the printer can only read storage data of the regenerated chip. Since a data signal sent from the printer by the first data signal wire is not only configured to read the storage data, but also configured to realize functions such as spray point control, the direct disconnection between the ink cartridge chip and the printer will result in the absence of some control functions of the printer and poor printing quality.

Figure 2:
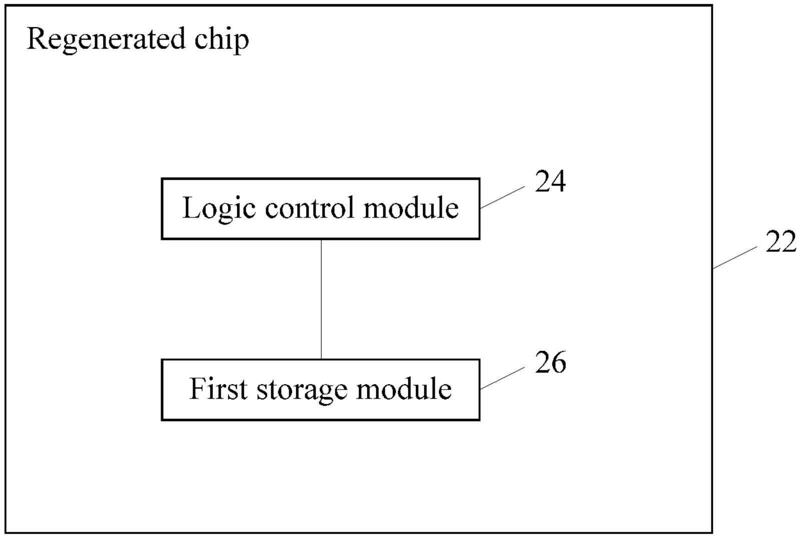
FIG. 2 is a first block diagram of a structure of a regenerated chip in an embodiment of the present disclosure.

In an embodiment, a regenerated chip 22 is provided. FIG. 2 is a first block diagram of a structure of the regenerated chip in an embodiment of the present disclosure. As shown in FIG. 2, the regenerated chip 22 can include a logic control module 24 and a first storage module 26, and the first storage module 26 can include at least one memory.

Figure 3A:
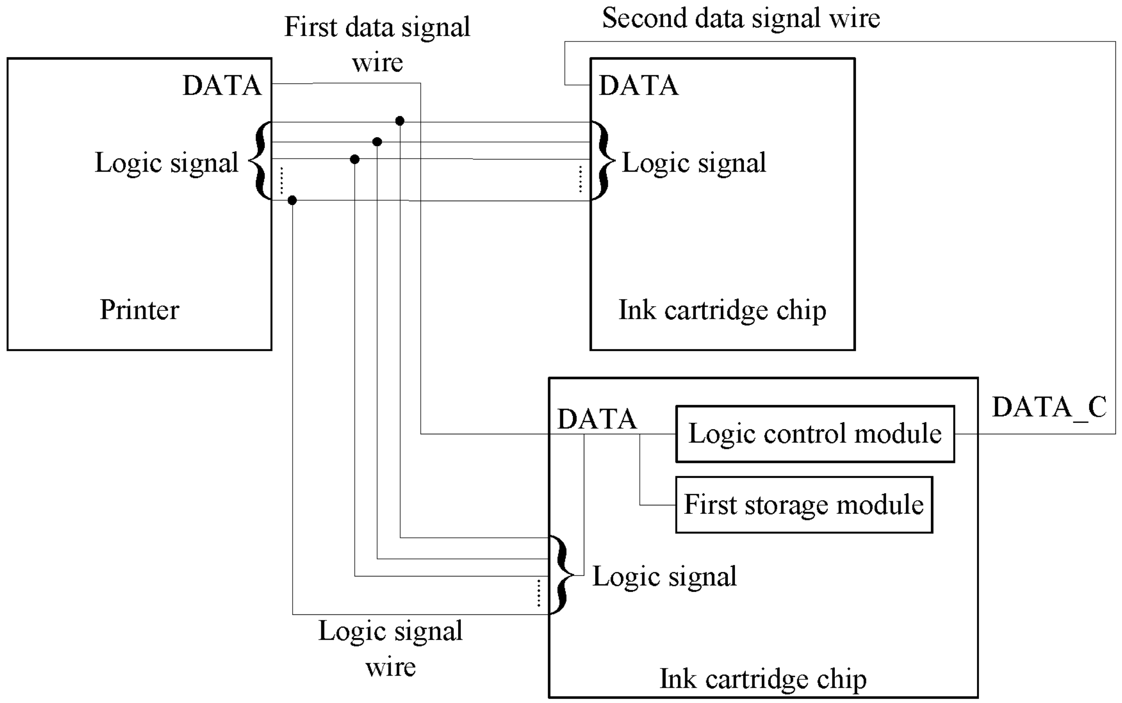
FIG. 3A is a first schematic diagram of a control circuit principle of a regenerated chip in an embodiment of the present disclosure.
Figure 3B:
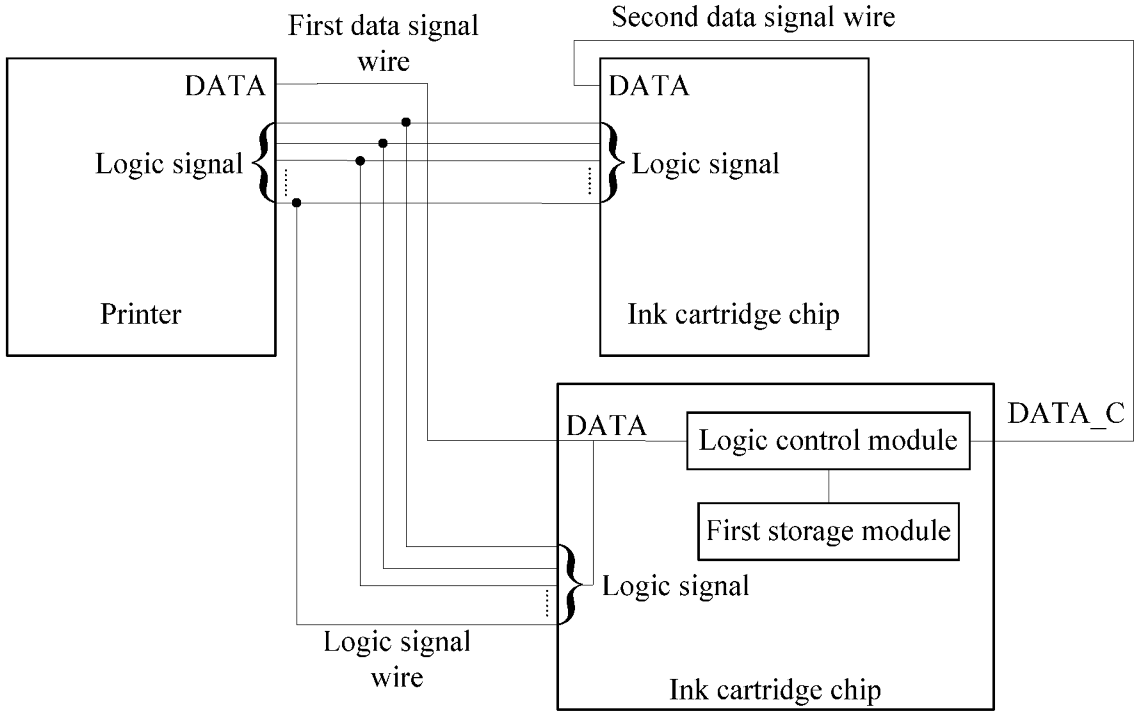
FIG. 3B is a second schematic diagram of a control circuit principle of a regenerated chip in an embodiment of the present disclosure.

FIG. 3A is a first schematic diagram of a control circuit principle of a regenerated chip in an embodiment of the present disclosure. As shown in FIG. 3A, the logic control module 24 is electrically connected to a DATA port of the ink cartridge chip by a second data signal wire, and the logic control module 24 is configured to control turn-on or turn-off of the second data signal wire. Both the first storage module 26 and the logic control module 24 are electrically connected to a DATA port of the printer by a first data signal wire. It can be understood that the control circuit of the regenerated chip can also include other connection. For example, FIG. 3B is a second schematic diagram of a control circuit principle of a regenerated chip in an embodiment of the present disclosure. As shown in FIG. 3B, the logic control module 24 is connected to the printer by the first data signal line and the logic signal line respectively, the first storage module 26 is connected to the logic control module 24, then the printer can first send a signal to the logic control module 24, and then the logic control module 24 can send the signal to the first storage module 26.

The first storage module 26 is configured to feed back storage data to the printer by means of the first data signal wire when the second data signal wire is turned off. Therefore, a storage data reading signal of the printer, i.e., a DATA signal, can first enter the regenerated chip 22 by the first data signal wire, and a DATA_C signal processed by the regenerated chip 22 can be transmitted to the ink cartridge chip by the second data signal line.

The first data signal wire connected to the DATA port of the printer can complete a selection function of an address in the first storage module 26 by a digital gate circuit, a shift register and other circuits. By determining a logical combination of signal of a selected address of the first storage module 26, it can determine whether a command sent by the printer has selected the address of a storage unit in the first storage module 26.

In the related art, the regenerated chip can only be used when the printer is directly disconnected to the ink cartridge chip in data connection, resulting in poor printing quality. In the above embodiment of the present disclosure, the logic control module 24 is disposed in the regenerated chip 22. The logic control module 24 is configured to judge a time to turn the first data signal wire on and thus be able to control the spray point, and judge a time to turn the first data signal wire off and thus feed back the storage data to the printer. A judgment of the logic control module 24 enables adaptive and accurate control of communication between the printer and the ink cartridge chip, thus replacing storage data in the ink cartridge chip by the storage data in the regenerated chip without affecting transmission of a printing command of the printer, and solving a problem of poor printing quality of the printer with the regenerated chip 22.

Figure 4:
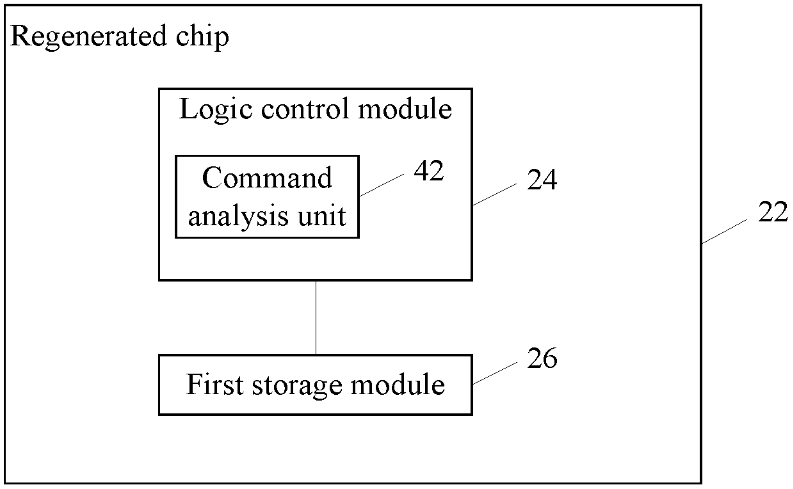
FIG. 4 is a second block diagram of a structure of a regenerated chip in an embodiment of the present disclosure.

In an embodiment, a regenerated chip is provided. FIG. 4 is a second block diagram of a structure of the regenerated chip in an embodiment of the present disclosure. As shown in FIG. 4, the regenerated chip can be applied in a circuit diagram of FIG. 3A and FIG. 3B. The logic control module 24 can include a command analysis unit 42 configured for detecting whether an operation command sent by the printer is configured to select the storage unit. The logic control module 24 is configured to control the second data signal wire to be turned off when a selected operation command is detected.

Figure 5:
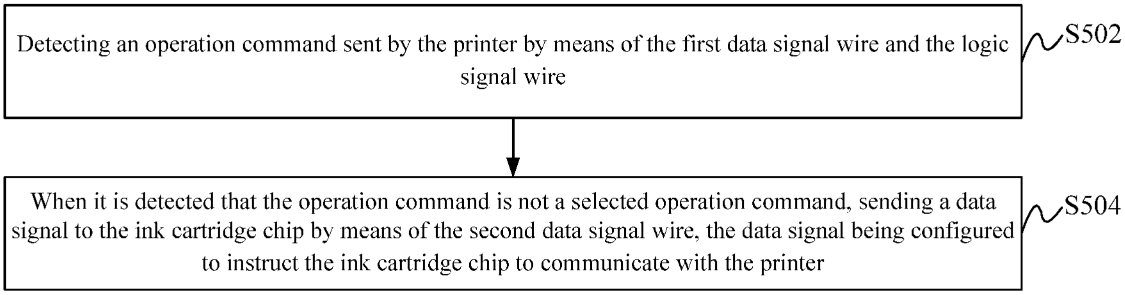
FIG. 5 is a first flowchart diagram of a method for controlling a regenerated chip in an embodiment of the present disclosure.

A method for controlling a regenerated chip is further provided in an embodiment. FIG. 5 is a first flowchart diagram of the method for controlling the regenerated chip in an embodiment of the present disclosure. As shown in FIG. 5, the method can be applied to the regenerated chip of FIG. 4. The method can include the following steps:

Step 502, detecting an operation command sent by the printer by means of the first data signal wire and the logic signal wire.

In some embodiments, when it is detected that each of a group of section signals, a group of row signals, and a group of column signals in the operation command is expressed as at least one high level, it is determined that the operation command is the selected operation command. The selected operation command is configured to indicate that the printer has selected the storage unit in the first storage module 26.

It should be noted that necessary conditions for selecting the storage unit include: in three groups of section signals, row signals and column signals of an address register of the storage module, (1) a high level must being expressed for section selection; (2) a high level must being expressed for row selection; and (3) a high level must being expressed for column selection. After the above three conditions (1)-(3) are satisfied, it is considered that the command sent by the printer is an operation of selecting the address of the storage unit of the first storage module 26.

It can be judged whether the above conditions are met by the following steps: firstly, a logical "or" operation can be performed on all section selected signals, all row selected signals, all column selected signals respectively, determining whether a high level is expressed in the three group of section signals, row signals and column signals; then, a logical "and" operation is performed on three signals generated after the above logical "or" operation; finally, a result is detected and analyzed, when the result after the logical "and" operation is 1, the received command is considered to be the selected operation command to select the storage unit, and when the result after the logical "and" operation is 0, the received command is not considered to be the selected operation command. The above steps can detect and judge whether the above conditions are met by the logical "or" operation and the logical "and" operation. Only a gate circuit is required in the circuit, so the circuit has a simple structure.

Step 504, when it is detected that the operation command is not a selected operation command, sending a data signal to the ink cartridge chip by means of the second data signal wire, the data signal being configured to instruct the ink cartridge chip to communicate with the printer.

In some embodiments, a communication between the ink cartridge chip and the printer can include a communication for spray point control or a communication for inkjet time transmission. For example, when the selected operation command is not detected, the regenerated chip 22 can transmit signal of the spray point control of the printer to the ink cartridge chip, which in turn enables the printer to accurately control the spray point of the ink cartridge chip.

In some embodiments, when it is detected that each of the group of section signals, the group of row signals, and the group of column signals in the operation command is expressed as at least one high level, and the result after the logical "or" operation and the logical "and" operation is 1, it is determined that the operation command is the selected operation command, i.e., the printer has selected the storage unit in the first storage module 26, and is ready to read the storage data. When it is detected that at least one of the group of section signals, the group of row signals, and the group of column signals is not expressed as high level, and the result after the logical "or" operation and the logical "and" operation is 0, it is determined that the operation command is not the selected operation command, i.e., the printer does not select the storage unit.

In some embodiments, when it is detected that the operation command is the selected operation command, the second data signal wire is controlled to be turned off and feed back storage data to the printer by means of the first data signal wire. Since the second data signal wire is controlled to be turned off by the logic control module 24 in the embodiment of the present disclosure, i.e., the communication between the ink cartridge chip and the printer is stopped, and the printer can only read the storage data in the regenerated chip 22, thus realizing use of the regenerated chip 22 effectively.

In the above step 502 to step 504, when the regenerated chip 22 receives the operation command of the printer, the operation command is detected and analyzed. When it is detected that the printer does not select the address of the storage unit of the first storage module 26, the second data signal wire is controlled to be turned on. Thus, the communication between the DATA signal and the original ink cartridge can be opened or stopped selectively based on the analysis and the judgment of the logic control module 24 to the command sent by the printer, implementing automatic control of opening and stopping communication between the printer and the ink cartridge chip according to the command, and avoiding inaccurate control of the spray point due to the communication being stopped directly.

Figure 6:
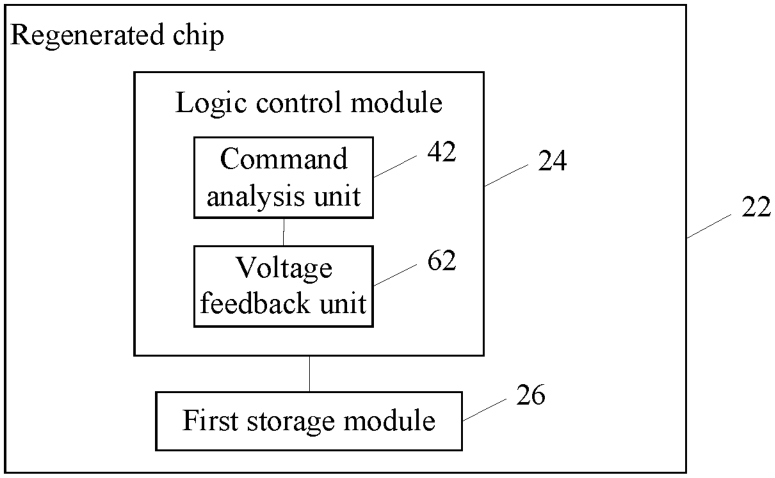
FIG. 6 is a third block diagram of a structure of a regenerated chip in an embodiment of the present disclosure.

In some embodiments, a regenerated chip is provided. FIG. 6 is a third block diagram of a structure of a regenerated chip in an embodiment of the present disclosure. As shown in FIG. 6, the logic control module 24 can further include a voltage feedback unit 62 configured for detecting a feedback voltage between the first storage module 26 of the regenerated chip 22 and a second storage module of the ink cartridge chip.

Figure 7:
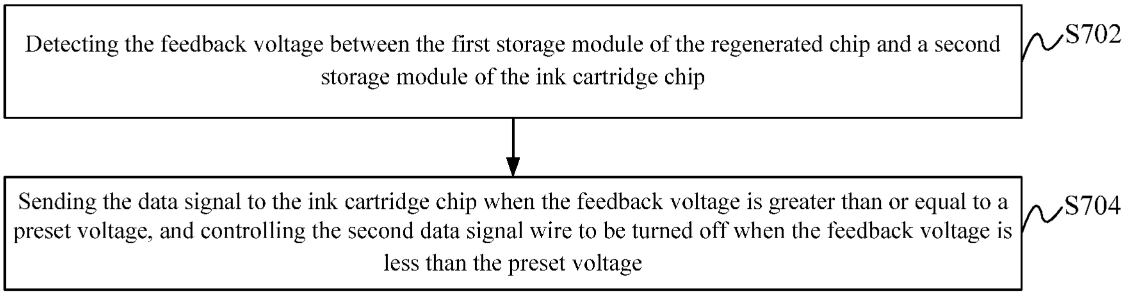
FIG. 7 is a second flowchart diagram of a method for controlling a regenerated chip in an embodiment of the present disclosure.

A method for controlling a regenerated chip is further provided in an embodiment. FIG. 7 is a second flowchart diagram of a method for controlling a regenerated chip in an embodiment of the present disclosure. As shown in FIG. 7, the method can be applied to the regenerated chip 22 of FIG. 6. The method can include the following steps:

Step 702, detecting the feedback voltage between the first storage module 26 of the regenerated chip 22 and a second storage module of the ink cartridge chip.

It should be noted that the printer can read storage data in the regenerated chip 22 and the ink cartridge chip initially. A feedback voltage of a memory is a feedback result of the first storage module 26 and the second storage module connected in parallel. There are the following three feedback results: (1) the feedback result is an original level, which means that the selected storage unit of the first storage module 26 does receive the DATA signal for reading the memory, i.e., the second data signal wire is turned off; (2) the feedback result is a high level, which means that no storage operation has been performed in the selected storage unit in the first storage module 26; (3) the feedback result is a low level, which means that a storage operation has been performed in the selected storage unit in the first storage module 26.

Step 704, sending the data signal to the ink cartridge chip when the feedback voltage is greater than or equal to a preset voltage, and controlling the second data signal wire to be turned off when the feedback voltage is less than the preset voltage.

A reference voltage can be preset as the preset voltage and be stored, for example, the preset voltage can be set to 15V.

In the above step 702 to step 704, the feedback voltage can be compared with the preset voltage to determine a feedback state of the ink cartridge chip and the regenerated chip 22, and turn-on or turn-off of the second data signal wire can be controlled according to the compared result of the feedback voltage and the preset voltage, so that the regenerated chip 22 can feed back storage data to the printer, ensuring accurate control of the printer to the ink cartridge such as spray point control of the ink cartridge, and solving the problem of poor printing quality of the printer with the regenerated chip 22.

Figure 8:
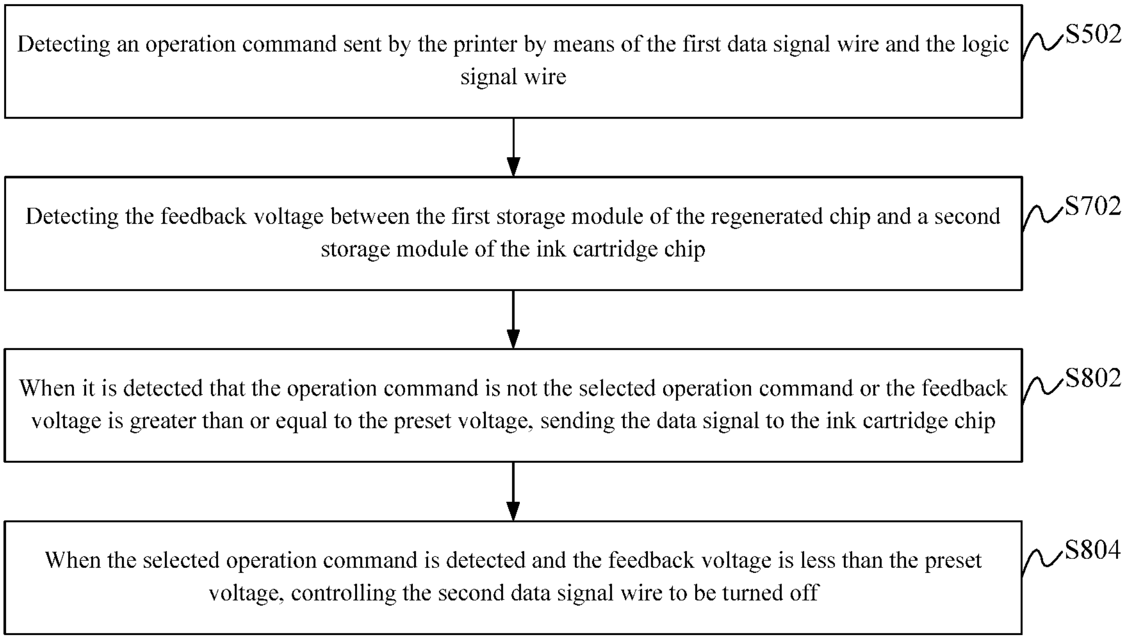
FIG. 8 is a third flowchart diagram of a method for controlling a regenerated chip in an embodiment of the present disclosure.

In some embodiments, a method for controlling a regenerated chip is further provided. FIG. 8 is a third flowchart diagram of a method for controlling a regenerated chip in an embodiment of the present disclosure. As shown in FIG. 8, the method can be applied to the regenerated chip 22 of FIG. 6. The method can include the following steps:

Step 802, when it is detected that the operation command is not the selected operation command or the feedback voltage is greater than or equal to the preset voltage, sending the data signal to the ink cartridge chip.

When it is detected that the operation command is not the selected operation command or the feedback voltage is greater than or equal to the preset voltage, the printer does not select the address of the storage unit in the first storage module 26, or no data has been stored in the selected storage unit in the first storage module 26. Therefore, the first storage module 26 does not need to send data to the printer, the second data signal wire can be kept turning on, and the regenerated chip 22 can send the data signal of the printer to the ink cartridge chip by the second data signal wire.

In some embodiments, the logic control module 24 can compare the feedback voltage with the preset voltage. When the feedback voltage is greater than or equal to the preset voltage, the logic control module 24 can generate a turn-on sub-signal configured to keep connection between the DATA signal of the printer and the ink cartridge chip, and the turn-on sub-signal can be defined as 0. When it is detected that the operation command is not the selected operation command or the turn-on sub-signal is detected, the data signal can be sent to the ink cartridge chip.

Step 804, when the selected operation command is detected and the feedback voltage is less than the preset voltage, controlling the second data signal wire to be turned off.

When the selected operation command is detected and the feedback voltage is less than the preset voltage, the printer has selected the address of the storage unit in the first storage module 26, and data has been stored in the selected storage unit of the first storage module 26. Therefore, the first storage module 26 should read data in the first storage module 26, i.e., the second data signal wire can be turned off, and the communication between the printer and the ink cartridge chip is stopped.

In some embodiments, when the logic control module 24 detects that the feedback voltage is less than the preset voltage, the logic control module 24 can generate a turn-off sub-signal configured to close the connection between the DATA signal of the printer and the ink cartridge chip, and the turn-off sub-signal can be defined as 1. When the selected operation command and the turn-off sub-signal are detected, the second data signal wire can be controlled to be turned off.

In the above step 802 to step 804, the logic control module is disposed in the regenerated chip 22 and configured to analyze the command of the printer and compare the feedback voltage, and the communication between the printer and the ink cartridge chip can be controlled based on an integrated analysis, realizing an isolation of data communication and logic signal transmission for memory reading. At the same time, an analysis of the command of the printer and comparation of the feedback voltage are considered, and it is judged whether the regenerated chip 22 should transit the DATA signal to the ink cartridge based on the integrated analysis, thus improving accuracy of communication control between the printer and the ink cartridge chip.

Although individual steps in the flowchart diagrams of FIG. 5, FIG. 7, and FIG. 8 are shown sequentially as indicated by the arrows, the steps are not necessarily performed sequentially in the order indicated by the arrows. Except as expressly stated herein, there is no strict sequential limitation on the execution of these steps, and the steps may be executed in any other order. Moreover, at least some of the steps in FIG. 5, FIG. 7, and FIG. 8 may include multiple sub-steps or multiple stages that are not necessarily performed at the same time, but may be performed at different times, and the order in which these sub-steps or stages are performed is not necessarily sequential, but may alternate with other steps or at least some of the sub-steps or stages of other steps.

Figure 9:
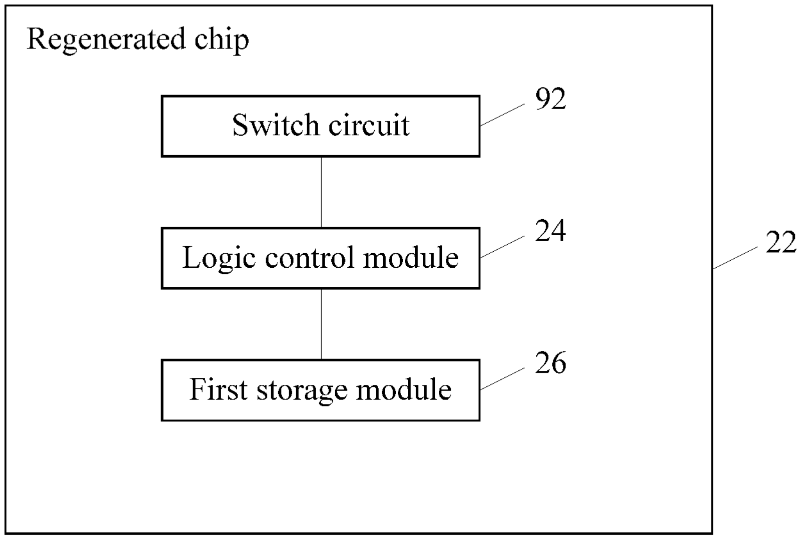
FIG. 9 is a fourth block diagram of a structure of a regenerated chip in an embodiment of the present disclosure.

In some embodiments, a regenerated chip and a method for controlling the same are provided. FIG. 9 is a fourth block diagram of a structure of a regenerated chip in an embodiment of the present disclosure. As shown in FIG. 9, the regenerated chip 22 is further provided with a switch circuit 92 connected to the logic control module 24. The switch circuit 92 is disposed in a wafer of the regenerated chip 22, or outside the wafer of the regenerated chip 22. The logic control module 24 is further configured to control turn-on or turn-off of the second data signal wire by means of the switch circuit 92. The switch circuit 92 can include a triode switching circuit. When the logic control module 24 transmits a high level signal according to the judgment, the triode switching circuit can be closed, enabling the first data signal wire to be turned off. The switch circuit 92 can further include a switching diode, a logic gate circuit, a bistable trigger or other switch circuit.

Figure 10:
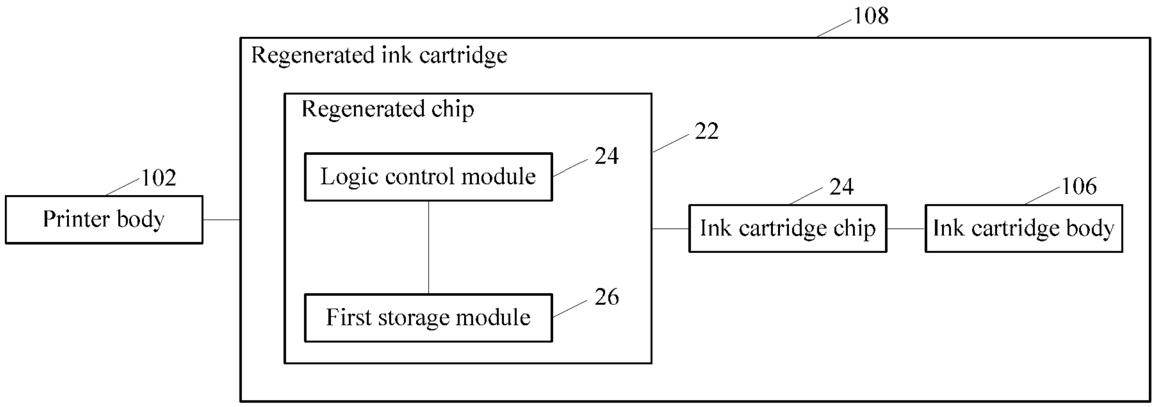
FIG. 10 is a block diagram of a regenerated ink cartridge in an embodiment of the present disclosure.

In some embodiments, a regenerated ink cartridge is provided. FIG. 10 is a block diagram of a regenerated ink cartridge in an embodiment of the present disclosure. As shown in FIG. 10, the regenerated ink cartridge 108 is electrically connected to a printer body 102, the regenerated ink cartridge 108 can include an ink cartridge body 106, an ink cartridge chip 104, and a regenerated chip 22, and the ink cartridge body 106 is connected to the ink cartridge chip 104.

The regenerated chip 22 can include a logic control module 24 and a first storage module 26. The logic control module 24 is electrically connected to the printer body 102 by means of a first data signal wire and a logic signal wire, and electrically connected to the ink cartridge chip 104 by means of a second data signal wire. The logic control module 24 is configured to detect a command sent from the printer body 102 by means of the first data signal wire and the logic signal wire, and control the second data signal wire to be turned on or turned off. The logic control module 24 is further configured to send a data signal to the ink cartridge chip 104 by means of the second data signal wire. The data signal is configured to instruct the ink cartridge chip 104 to communicate with the printer body 102.

In the above embodiments, the logic control module 24 is disposed in the regenerated chip 22. The logic control module 24 is configured to judge a time to turn the first data signal wire on and thus be able to control the spray point, and judge a time to turn the first data signal wire off and thus feed back the storage data to the printer. A judgment of the logic control module 24 enables adaptive and accurate control of communication between the printer and the ink cartridge chip 104, thus replacing storage data in the ink cartridge chip 104 by the storage data in the regenerated chip 22 without affecting transmission of a printing command of the printer body 102, and solving a problem of poor printing quality of the printer with the regenerated chip 22.

The technical features of the above-described embodiments may be combined in any combination. For the sake of brevity of description, all possible combinations of the technical features in the above embodiments are not described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

We claim:

1. A method for controlling a regenerated chip, wherein the regenerated chip is electrically connected to a printer by means of a first data signal wire and a logic signal wire, and is electrically connected to an ink cartridge chip by means of a second data signal wire, and the method comprises:

detecting an operation command sent by the printer by means of the first data signal wire and the logic signal wire; and when it is detected that the operation command is not a selected operation command, sending a data signal to the ink cartridge chip by means of the second data signal wire, wherein the data signal is configured to instruct the ink cartridge chip to communicate with the printer.

2. The method of claim 1, wherein after the detecting the operation command sent by the printer, the method further comprises:

when it is detected that the operation command is the selected operation command, controlling the second data signal wire to be turned off and feeding back storage data to the printer by means of the first data signal wire.

3. The method of claim 1, wherein before the sending the data signal to the ink cartridge chip by means of the second data signal wire, the method further comprises:

detecting a feedback voltage between a first storage module of the regenerated chip and a second storage module of the ink cartridge chip, wherein the first storage module and the second storage module are connected in parallel;

sending the data signal to the ink cartridge chip when the feedback voltage is greater than or equal to a preset voltage; and controlling the second data signal wire to be turned off when the feedback voltage is less than the preset voltage.

4. The method of claim 3, wherein after detecting the feedback voltage between the first storage module of the regenerated chip and the second storage module of the ink cartridge chip, the method further comprises:

when it is detected that the operation command is not the selected operation command or the feedback voltage is greater than or equal to the preset voltage, sending the data signal to the ink cartridge chip; and when the selected operation command is detected and the feedback voltage is less than the preset voltage, controlling the second data signal wire to be turned off.

5. The method of claim 4, further comprising:

when the feedback voltage is greater than or equal to the preset voltage, generating a turn-on sub-signal;

when the feedback voltage is less than the preset voltage, generating a turn-off sub-signal;

when it is detected that the operation command is not the selected operation command or the turn-on sub-signal is detected, sending the data signal to the ink cartridge chip; and when both the selected operation command and the turn-off sub-signal are detected, controlling the second data signal wire to be turned off.

6. The method of claim 5, wherein detecting that the operation command sent by the printer is not the selected operation command comprises:

when it is detected that each of a group of section signals, a group of row signals, and a group of column signals in the operation command is expressed as at least one high level, determining that the operation command is the selected operation command; and when it is detected that at least one of the group of section signals, the group of row signals, and the group of column signals is not expressed as high level, determining that the operation command is not the selected operation command.

7. The method of claim 1, wherein a communication between the ink cartridge chip and the printer comprises a communication for spray point control or a communication for inkjet time transmission.

8. The method of claim 1, further comprising:

controlling turn-on or turn-off of the second data signal wire by means of a switch circuit;

wherein the switch circuit is disposed in a wafer of the regenerated chip, or outside the wafer of the regenerated chip.

9. The method of claim 8, wherein the switch circuit comprises at least one of a triode switching circuit, a switching diode, a logic gate circuit, or a bistable trigger.

10. A regenerated chip applied to a regenerated ink cartridge, the regenerated chip comprising a logic control module and a first storage module;

wherein the logic control module is electrically connected to a printer by means of a first data signal wire and a logic signal wire, and is electrically connected to an ink cartridge chip by means of a second data signal wire;

the logic control module comprises a command analysis unit configured for detecting an operation command sent by the printer by means of the first data signal wire and the logic signal wire;

the logic control module is configured for sending a data signal to the ink cartridge chip by means of the second data signal wire when it is detected that the operation command is not a selected operation command, wherein the data signal is configured to instruct the ink cartridge chip to communicate with the printer; and the logic control module is further configured for controlling the second data signal wire to be turned off when it is detected that the operation command is the selected operation command, and the first storage module is configured for feeding back storage data to the printer by means of the first data signal wire.

11. The regenerated chip of claim 10, wherein the logic control module further comprises a voltage feedback unit;

the voltage feedback unit is configured for detecting a feedback voltage between the first storage module of the regenerated chip and a second storage module of the ink cartridge chip, wherein the first storage module and the second storage module are connected in parallel;

the logic control module is further configured for sending the data signal to the ink cartridge chip when the feedback voltage is detected to be greater than or equal to a preset voltage; and the logic control module is further configured for controlling the second data signal wire to be turned off when the feedback voltage is detected to be less than the preset voltage.

12. The regenerated chip of claim 11, wherein the logic control module is further configured for sending the data signal to the ink cartridge chip when it is detected that the operation command is not the selected operation command or the feedback voltage is greater than or equal to the preset voltage; and the logic control module is further configured for controlling the second data signal wire to be turned off when the selected operation command is detected and the feedback voltage is less than the preset voltage.

13. The regenerated chip of claim 12, wherein the logic control module is further configured for generating a turn-on sub-signal when the feedback voltage is greater than or equal to the preset voltage;

the logic control module is further configured for generating a turn-off sub-signal when the feedback voltage is less than the preset voltage;

the logic control module is further configured for sending the data signal to the ink cartridge chip when it is detected that the operation command is not the selected operation command or the turn-on sub-signal is detected; and the logic control module is further configured for controlling the second data signal wire to be turned off when both the selected operation command and the turn-off sub-signal are detected.

14. The regenerated chip of claim 13, wherein the logic control module is further configured for determining that the operation command is the selected operation command when it is detected that each of a group of section signals, a group of row signals, and a group of column signals in the operation command is expressed as at least one high level; and the logic control module is further configured for determining that the operation command is not the selected operation command when it is detected that at least one of the group of section signals, the group of row signals, and the group of column signals is not expressed as high level.

15. The regenerated chip of claim 10, wherein the regenerated chip is provided with a switching circuit, the switching circuit is connected to the logic control module, and the switching circuit is disposed in the regenerated chip or outside a wafer of the regenerated chip; and the logic control module is further configured for controlling turn-on or turn-off of the second data signal wire by means of the switch circuit.

16. A regenerated ink cartridge, comprising an ink cartridge body, an ink cartridge chip and a regenerated chip, wherein the ink cartridge body is connected to the ink cartridge chip, and the regenerated chip comprises a logic control module and a first storage module;

wherein the logic control module is electrically connected to a printer by means of a first data signal wire and a logic signal wire, and is electrically connected to an ink cartridge chip by means of a second data signal wire;

the logic control module comprises a command analysis unit configured for detecting an operation command sent by the printer by means of the first data signal wire and the logic signal wire;

the logic control module is configured for sending a data signal to the ink cartridge chip by means of the second data signal wire when it is detected that the operation command is not a selected operation command, wherein the data signal is configured to instruct the ink cartridge chip to communicate with the printer; and the logic control module is further configured for controlling the second data signal wire to be turned off when it is detected that the operation command is the selected operation command, and the first storage module is configured for feeding back storage data to the printer by means of the first data signal wire.

17. The regenerated ink cartridge of claim 16, wherein the logic control module further comprises a voltage feedback unit;

the voltage feedback unit is configured for detecting a feedback voltage between the first storage module of the regenerated chip and a second storage module of the ink cartridge chip, wherein the first storage module and the second storage module are connected in parallel;

the logic control module is further configured for sending the data signal to the ink cartridge chip when the feedback voltage is detected to be greater than or equal to a preset voltage; and the logic control module is further configured for controlling the second data signal wire to be turned off when the feedback voltage is detected to be less than the preset voltage.

18. The regenerated ink cartridge of claim 17, wherein the logic control module is further configured for sending the data signal to the ink cartridge chip when it is detected that the operation command is not the selected operation command or the feedback voltage is greater than or equal to the preset voltage; and the logic control module is further configured for controlling the second data signal wire to be turned off when the selected operation command is detected and the feedback voltage is less than the preset voltage.

19. The regenerated ink cartridge of claim 18, wherein the logic control module is further configured for generating a turn-on sub-signal when the feedback voltage is greater than or equal to the preset voltage;

the logic control module is further configured for generating a turn-off sub-signal when the feedback voltage is less than the preset voltage;

the logic control module is further configured for sending the data signal to the ink cartridge chip when it is detected that the operation command is not the selected operation command or the turn-on sub-signal is detected; and the logic control module is further configured for controlling the second data signal wire to be turned off when both the selected operation command and the turn-off sub-signal are detected.

20. The regenerated ink cartridge of claim 16, wherein the regenerated chip is provided with a switching circuit, the switching circuit is connected to the logic control module, and the switching circuit is disposed in the regenerated chip or outside a wafer of the regenerated chip;

the logic control module is further configured for controlling turn-on or turn-off of the second data signal wire by means of the switch circuit.

* * * * *